United States Patent
Frauenfeld

(10) Patent No.: US 6,460,453 B1
(45) Date of Patent: Oct. 8, 2002

(54) COVER SYSTEM

(75) Inventor: Victor M. Frauenfeld, Cleveland, WI (US)

(73) Assignee: The Vollrath Company, L.L.C., Sheboygan, WI (US)

(*) Notice: Subject to any disclaimer, the term of this patent is extended or adjusted under 35 U.S.C. 154(b) by 0 days.

(21) Appl. No.: 09/989,639

(22) Filed: Nov. 20, 2001

(51) Int. Cl.⁷ .................. A47J 27/00; A47J 27/04; A47J 27/06; F24C 1/16; F24C 3/02

(52) U.S. Cl. ................ 99/483; 99/339; 99/449; 126/33; 126/40; 126/43; 220/212.5; 220/657; 220/694

(58) Field of Search .................. 99/339, 340, 403–418, 99/448, 449, 483; 126/9 R, 9 A, 33, 39 E, 39 B, 39 H, 40, 43, 44, 45, 50; 426/113, 407, 523; 431/144, 146, 344, 354; 220/657, 694, 912, 212.5, 573.4; D7/355, 366

(56) References Cited

U.S. PATENT DOCUMENTS

| | | | |
|---|---|---|---|
| 76,639 A | | 4/1868 | Lawrence |
| 931,497 A | | 8/1909 | Schille |
| 1,701,989 A | * | 2/1929 | Turner ................. 126/37 R |
| 2,561,118 A | | 7/1951 | Horvath |
| D192,900 S | * | 5/1962 | Epstein ................. D7/364 |
| 3,283,944 A | | 11/1966 | Richardson |
| 3,361,126 A | * | 1/1968 | Bloomfield ............ 126/40 X |
| 4,320,849 A | | 3/1982 | Yellin |
| 4,334,629 A | | 6/1982 | Koch et al. |
| D275,643 S | * | 9/1984 | Petteson ................. D7/355 |
| 4,832,295 A | * | 5/1989 | Wagner ............... 126/215 X |
| 4,838,446 A | * | 6/1989 | Ali ..................... 220/694 |
| D305,972 S | * | 2/1990 | Pearce ................... D7/366 |
| 4,899,722 A | * | 2/1990 | Horewitch ............. 129/40 X |
| 4,920,873 A | * | 5/1990 | Stevens ................. 99/339 |
| 5,012,791 A | * | 5/1991 | McCabe ................. 126/43 |
| 5,045,672 A | * | 9/1991 | Scott ................. 126/33 X |
| 5,076,429 A | | 12/1991 | Patrick et al. |
| 5,119,800 A | * | 6/1992 | Roberts et al. ........ 126/43 X |
| 5,211,157 A | * | 5/1993 | Schwartz et al. ...... 431/255 X |
| 5,307,799 A | * | 5/1994 | Scarnato et al. .......... 126/45 |
| 5,347,979 A | * | 9/1994 | Haber ................... 126/43 |
| 5,355,558 A | | 10/1994 | Vertanen |
| 5,355,869 A | * | 10/1994 | Pickard et al. ........ 426/113 X |
| 5,360,132 A | | 11/1994 | Edelhoff |
| 5,467,697 A | * | 11/1995 | Hunziker ................ 99/449 |
| D365,724 S | | 1/1996 | Yu |
| 5,517,903 A | * | 5/1996 | Kaufman ................ 99/449 |
| 5,567,146 A | * | 10/1996 | Blankenship et al. ....... 431/320 |
| 5,584,283 A | * | 12/1996 | Messina ................. 126/43 |
| 5,711,210 A | * | 1/1998 | Kaufman ................ 99/340 |
| 5,788,196 A | | 8/1998 | Forman |

OTHER PUBLICATIONS

St. Andrew Buffetware, Chafers and Urns, WellSet website, printed on Mar. 25, 2002, 5 pages.

* cited by examiner

*Primary Examiner*—Timothy F. Simone
(74) *Attorney, Agent, or Firm*—Foley & Lardner

(57) ABSTRACT

A covering system includes a frame, a cover pivotally coupled to the frame and a stop surface pivotally coupled to the frame. The cover pivots between a closed position, a substantially open position and at least one intermediate position. The stop surface pivots between a first position in which the stop surface engages the cover when the cover is in the at least one intermediate position to retain the cover in the at least one intermediate position and a second position permitting the cover to be pivoted to at least one of the substantially open position and the closed position. The stopper includes a counterweight which biases the stop surface towards the first position as a result of gravity.

23 Claims, 4 Drawing Sheets

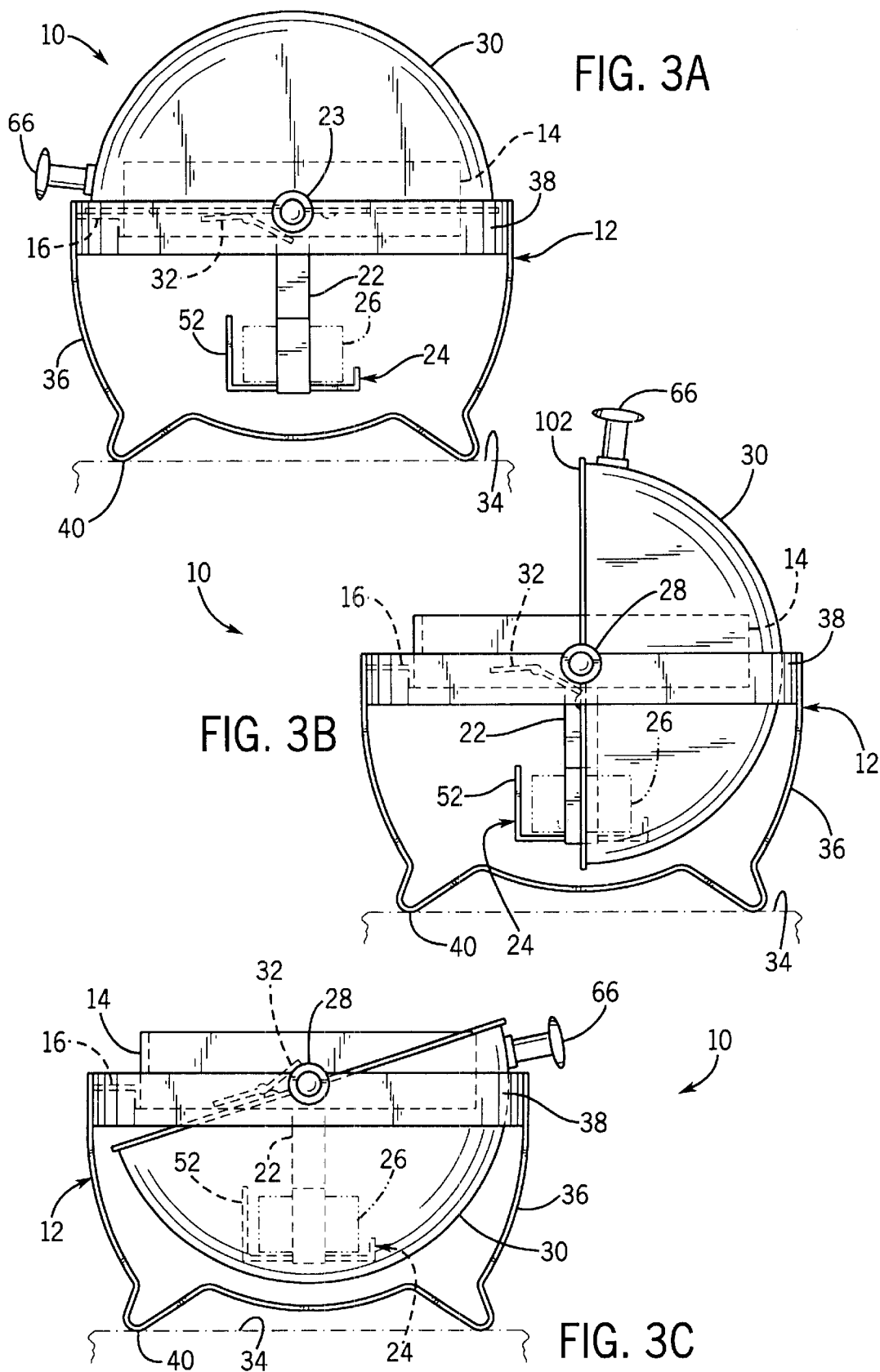

COVER SYSTEM

FIELD OF THE INVENTION

The present invention generally relates to the covers and systems for actuating such covers. In particular, the present invention relates to covering systems which include a cover that rotates or pivots between a covering position and a non-covering position. More specifically, the present invention relates to food covering systems employing a roll top cover.

BACKGROUND OF THE INVENTION

Food covering systems are utilized to protect food from outside contaminants and to maintain the temperature or moisture characteristics of the food being covered. One common covering system utilizes a cover which pivots between opened and closed states. Such covering systems are commonly employed in food containers or dishes and in chafers. With such systems, it is frequently desirable to position the cover in a partially closed or intermediate state so as to partially cover and protect the food while still enabling the food to be viewed. Prior attempts to provide such covers for food have met with limited success. For example, many conventional chafers which enable the cover to move to the intermediate state require mechanical stoppers that have multiple parts. These stoppers not only increase the manufacturing complexity and cost of such chafers, but also make cleaning and sanitation a difficult task.

Thus, there is a continuing need for a mechanism that allows a cover to be rotated or pivoted to a closed position, a substantially opened position and at least one intermediate position, wherein the mechanism is simple, easy to assemble and easy to clean.

SUMMARY OF THE INVENTION

According to one exemplary embodiment, a covering system includes a frame, a cover pivotally coupled to the frame and a stop surface pivotally coupled to the frame. The cover pivots between a closed position, a substantially open position and at least one intermediate position. The stop surface pivots between a first position in which the stop surface engages the cover when the cover is in the at least one intermediate position to retain the cover in the at least one intermediate position and a second position permitting the cover to be pivoted to at least one of the substantially open position and the closed position. The stop surface is biased towards the first position by gravity.

According to another exemplary embodiment, a cover system includes a frame, a cover pivotally coupled to the frame and a stopper pivotally coupled to the frame. The cover includes a detent and pivots between a closed position, a substantially open position and at least one intermediate position. The stopper includes a stop surface that pivots between an engaged position so as to engage the detent of the cover when the cover is in the intermediate position to prevent the cover from further pivoting towards the open position and a disengaged position so as to permit the cover to rotate to the open position. The stopper provides a counterweight on a second side of the axis so that the stop surface is biased towards the engaged position by means of gravity.

In yet another exemplary embodiment, a roll top chafer includes a frame, a food pan coupled to the frame, a support coupled to the frame and adapted to support a heat source beneath the food pan, a cover and a stopper. The cover includes a detent and is pivotally coupled to the frame for rotation between a closed position, a substantially open position and an intermediate position. The stopper pivots about an axis and includes a stop surface that pivots between an engaged position so as to engage the detent of the cover when the cover is in the intermediate position to prevent the cover from further pivoting towards the open position and a disengaged position so as to permit the cover to rotate to the open position. The stopper provides a counterweight on a second side of the axis so that the stop surface is biased towards the engaged position by means of gravity.

BRIEF DESCRIPTION OF THE DRAWINGS

FIG. 3A is a right side elevational view of the covering system of FIG. 1 illustrating the cover in the closed position.

FIG. 3B is a right side elevational view of the covering system of FIG. 1 illustrating the cover in an intermediate position.

FIG. 3C is a right side elevational view of the covering system of FIG. 1 illustrating the cover in a substantially open position.

DETAILED DESCRIPTION OF THE PREFERRED EMBODIMENTS

Figure 1:
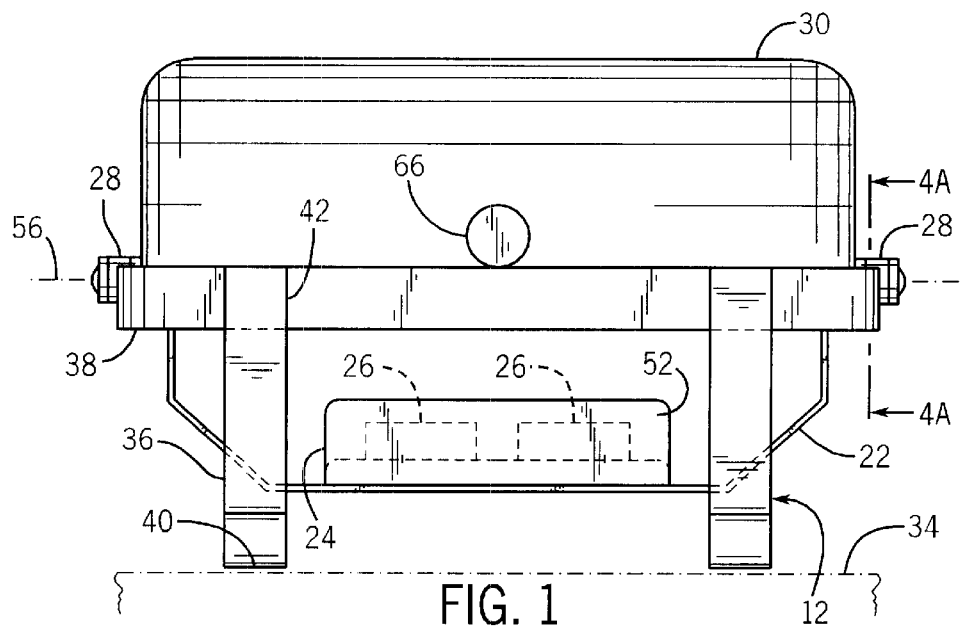
FIG. 1 is a side elevational view of a exemplary embodiment of a covering system of the present invention with a cover in a closed position.

FIGS. 1–2 and 5–7 illustrate covering system 10 in a closed state. Covering system 10 (shown as a roll top chafer) generally includes outer frame 12, inner frame 14, connector 16, water pan 18, food pan 20, support 22, holder 24, heat sources 26, pivot mechanisms 28, cover 30 and stopper 32. Frame 12 generally comprises a rigid structure configured to support the remaining components of system 10 relative to a supporting surface 34 such as the horizontal surface provided by table, counter and the like. Outer frame 12 generally includes legs 36 and trim 38. Legs 36 provide lower surfaces or feet 40 configured to rest upon a supporting surface 34 and provide upper ends 42 which are secured to trim 38. Trim 38 extends between legs 36 and is joined to inner frame 14 so as to support inner frame 14. Trim 38 also supports cover 30 relative to inner frame 14.

Inner frame 14 general comprises a rigid structure coupled to and supported by outer frame 12 inside of outer frame 12. Inner frame 14 is configured to support at least one of an outer pan (commonly referred to as water pan) and an inner food pan. Although, inner frame 14 is illustrated as comprising a continuous structure configured to continuously surround water pan 18 and food pan 20, inner frame 14 may alternatively be configured to only partially surround such pans or to engage selected portions of the outermost pan. In the preferred embodiment illustrated, inner frame 14 is configured to releasably support either a water pan 18 (as shown) or a food pan 20 (when water pan 18 is not employed). Although less desirable, inner frame 14 may be permanently mounted, welded or otherwise fastened to the outermost pan of water pan 18 or food pan 20 or may be integrally formed as part of or provided by the outermost pan of water pan 18 and food pan 20. In alternative embodiments, inner frame 14 may be fixedly coupled to integrally formed as part of outer frame 12. In yet other embodiments, covering system 10 may merely employ a single frame structure which simultaneously supports a pan and which includes roller surfaces adapted to rest upon a support surface such as a counter, table and the like.

Figure 7:
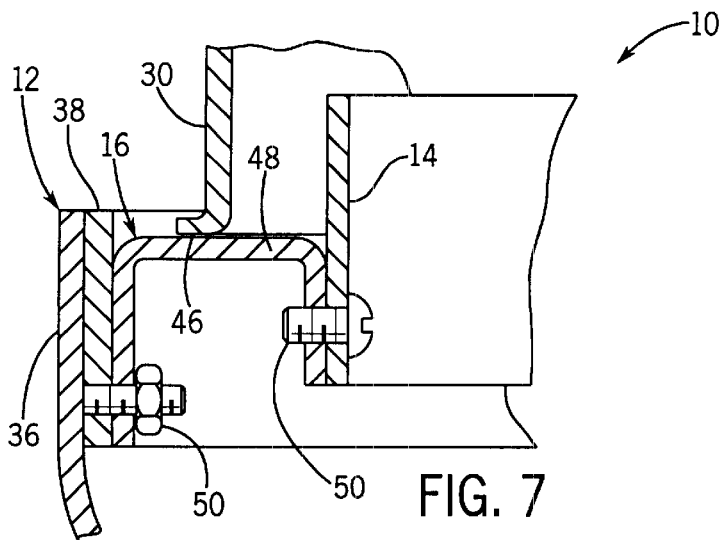
FIG. 7 is an enlarged fragmentary sectional view of the covering system of FIG. 2 taken along line 7—7.

Connectors 16 extend between and interconnect outer frame 12 and inner frame 14. Connectors 16 further provide a stop surface 46 upon which cover 30 may rest when closed (as best shown by FIG. 7). In an exemplary embodiment, system 10 is provided with a pair of connectors 16 located at spaced positions along front side 47 of system 10. Alternatively, system 10 may be provided with additional connectors 16 located at additional locations along front side 47 or alternatively between pivot mechanisms 28 and front side 47. Furthermore, in lieu of comprising a plurality of spaced connectors 16, system 10 may be provided with a single connector 16 which extends along only a portion of front side 47 or which continuously extends between outer frame 12 and inner frame 14 and between pivot mechanisms 28.

FIG. 7 illustrates one of connectors 16 in greater detail. As shown by FIG. 7, connector 16 generally comprises a U-shaped bracket 48 fastened between outer frame 12 and inner frame 14. Although bracket 48 is illustrated as being secured by fasteners such as screws or bolts 50, bracket 48 may alternatively be secured to frames 12 and 14 by welding, adhesives, mechanical interlocking structures or other fastening methods. In particular embodiments, bracket 48 may be integrally formed as part of either or both of frames 12 and 14.

Water pan 18 and food pan 20 comprise conventionally known or future developed pans which generally include a floor and upstanding side walls that form a basin for containing water, ice or food. Water pan 18 (schematically illustrated by a single solid box in FIG. 2 only) is configured to rest upon inner frame 14 and typically holds water which is heated to maintain a constant temperature about food pan 20. In alternative applications, water pan 18 may include other temperature maintaining, cooling or heating means, such as ice for cooling food contained within food pan 20. Food pan 20 (schematically shown by a single solid box in FIG. 2 only) contains food being heated or chilled. As noted above, depending upon the characteristics of the food maintained in food pan 20, water pan 18 may be omitted. Water pan 18 and food pan 20 may have a variety of well known designs and configurations. In an exemplary embodiment, food pan 20 preferably has a configuration set forth and described in co-pending U.S. patent application Ser. No. 09/540,563, entitled FOOD SERVING AND PAN SYSTEM and filed on Mar. 31, 2000, the full disclosure which is hereby incorporated by reference. One exemplary embodiment of water pan 18 is also shown in the same co-pending application incorporated by reference. Alternatively, water pan 18 and food pan 20 may have other configurations. Because water pan 18 and food pan 20 are preferably releasably supported by the remainder of system 10, water pan 18 and food pan 20 may be manufactured and distributed separate from the remaining components of system 10.

Support 22 extends below inner frame 14 and below water pan 18 and is supported by inner frame 14. In an exemplary embodiment, support 22 is suspended by inner frame 14. Alternatively, support 22 may be suspended from outer frame 12. Although less desirable, support 22 may be provided as a separate component or may be independently supported. Support 22 comprises a structure configured to support holder 24 and heat sources 26 below water pan 18 and below food pan 20.

Holder 24 comprises a structure configured to hold heat sources 26. relative to support 22. In an exemplary embodiment, holder 24 comprises trough or cup shaped member configured to receive a plurality of heat sources 26. Holder 24 further includes a wind guard 52 which provides a wall extending from support 22 above heat sources 26 towards front side 47. Wind guard 52 impedes air movement adjacent to heat sources 26 so as to prevent the flames from heat sources 26 from being accidentally blown out. The configuration of holder 24 may be varied depending upon the type of heat sources 26 employed. For example, in alternative embodiments where heat source 26 does not produce a flame, wind guard 52 may be omitted. Although holder 24 is illustrated as generally comprising a narrow trough shaped member configured to receive heat sources 26, holder 24 may alternatively comprise a tray, panel or other structure configured to support heat sources 26.

Heat sources 26 comprise conventionally known or future developed sources configured to generate heat and apply, heat to the contents of water pan 18 and food pan 20. In an exemplary embodiment illustrated, heat sources 26 comprise conventionally known fuel holders containing fuel which burns to produce a flame. Alternatively, heat sources 26 may comprise electric heaters as such as those sold by the Vollrath Company, L.L.C. of Sheboygan, Wis. Such heat sources may also alternatively utilize inductive heating and the like. In particular applications where the heating element is provided as part of either food pan 18 or water pan 20, supports 22, holder 24 and the heat sources may be omitted.

Figure 5:
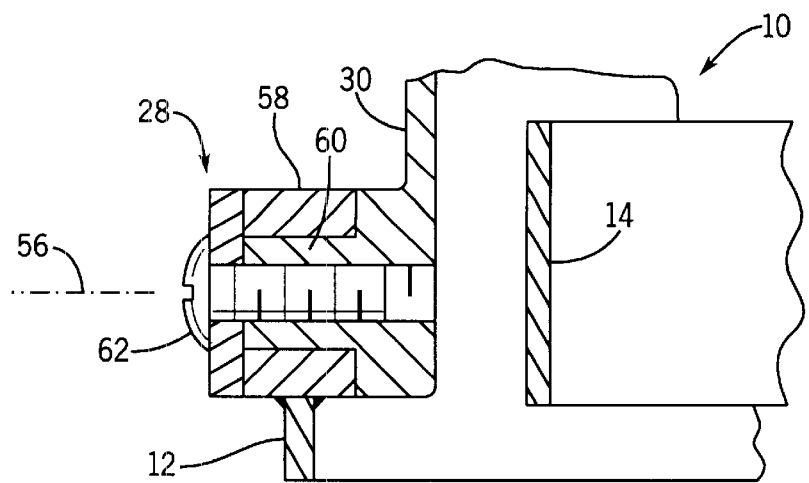
FIG. 5 is an enlarged fragmentary sectional view of the covering system of FIG. 2 taken along line 5—5.

Pivot mechanisms 28 comprise mechanisms configured to pivotably support cover 30 for rotation or pivotal movement about axis 56. As best shown by FIG. 5, each pivot mechanism 28 generally comprises an annular sleeve 58 and pivot pin portion 60. Sleeve 58 is secured to outer frame 12 and rotatably receives pivot pin portion 60. Pivot pin portion 60 is fixably joined to cover 30 and is captured within sleeve 58 such that cover 30 may pivot about axis 56. In the exemplary embodiment, pivot pin portion 60 is integrally formed as part of a single unitary body with cover 30 and is captured within sleeve 58 by fastener 62 (shown as a washer and bolt). Alternatively, pivot pin portion 60 may be fastened, welded or the right secured to cover 30 and may be retained within sleeve 58 by alternative conventionally known or future developed mechanisms. Moreover, cover 30 may alternatively be provided with an annular sleeve or an opening which receives a pin, shaft or rod coupled to outer frame 12 to enable cover 30 to pivot relative to outer frame 12. In additional alternative embodiments, cover 30 may be pivotably supported by pivot mechanisms formed with inner frame 14. Although less desirable, sleeve 58 may be omitted and replaced by a bore or other aperture formed in outer frame 12. Pivot mechanisms 28 are preferably located between front side 47 and rear side 49 of system 10. In the exemplary embodiment, pivot mechanisms 28 are preferably equidistantly spaced from front side 47 and rear side 49 of system 10 to minimize the height at which cover 30 extends above inner frame 14 during pivotal movement of cover 30.

Cover 30 comprises a rigid cover member having an arcuate side profile. Cover 30 preferably includes a handle 66 on front side 47 by which cover 30 may be rotated about axis 56. Cover 30 rotates between a closed position shown in FIGS. 1–2 and 3A, an open position shown in FIG. 3C and an intermediate position shown in FIG. 3B, as will be described in greater detail hereafter with respect to FIGS. 3A–3C and 4A–4C.

Stopper 32 extends on one side of system 10 and is configured to selectively engage and temporarily retain cover 30 in either the open position or the intermediate position. Stopper 32 provides a stop surface 70 which rotates or pivots about axis 72 between a first position in which the stop surface 70 engages cover 30 when cover 30 is in the intermediate position to retain cover 30 in the intermediate position and a second position permitting cover 30 to be pivoted to at least one of either the substantially open position or the fully closed position. In the exemplary embodiment, in the second position, stop surface 70 permits cover 30 to be pivoted to the substantially open position. Although system 10 is illustrated as including a stopper 32 located on the right side of inner frame 14 of system 10, system 10 may alternatively utilize a stopper 32 on the left side of system 10.

Figure 6:
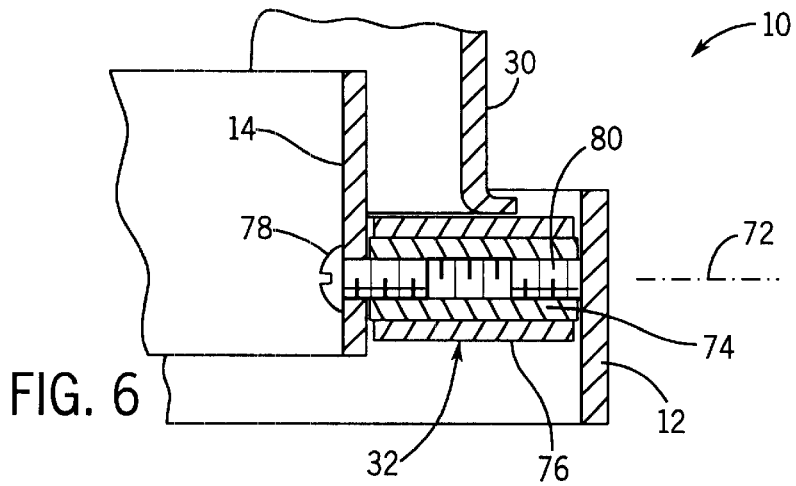
FIG. 6 is an enlarged fragmentary sectional view of the covering system of FIG. 2 taken along line 6—6.

As best shown by FIG. 6, stopper 32 is pivotally supported between outer frame 12 and inner frame 14 by pivot post 74 extending between frames 12 and 14. In particular, stopper 32 includes an annular sleeve 76 receiving a post 74. Sleeve 76 is captured between outer frame 12 and inner frame 14 so as to be retained upon post 74. In the exemplary embodiment, post 74 is joined to both outer frame 12 and inner frame 14 by fasteners 78, 80. Fastener 78 preferably comprises a screw or threaded bolt extending through inner frame 14 preferably engaging an internal bore of shaft 74. Fastener 80 comprises a threaded stud fixed to outer frame 12 by welding and threadably engaging an internal bore of post 74. Alternatively, post 74 may be secured to frames 12 and 14 by various other mechanisms and methods. For example, post 74 may alternatively be secured to frames 12 and 14 by other various conventionally known or future developed fasteners, by welding and the like. Post 74 may be also be integrally formed as part of a single unitary body with either or both the frames 12 and 14. In the embodiment illustrated, because post 74 joins frames 12 and 14, post 74 further serves to secure or support inner frame 14 relative to outer frame 12. On the side of system 10 where a stopper 32 is not provided, post 74 has a slightly enlarged diameter such that cover 32 is level in its closed state. In alternative embodiments, where cover 32 rests solely upon connector 16, this characteristic may be modified. Moreover, in alternative embodiments, post 74 may be configured so as to not connect frames 12 and 14 but so as to merely extend from one of frame 12 or frame 14 for supporting a stopper 32.

Although stopper 32 is illustrated as being pivotally supported about axis 72 by means of sleeve 76 at least partially encirculating post 74, stopper 32 may be pivotally supported by various other mechanisms and methods. For example, either or both of frames 12 and 14 may be provided with a bore opening which receives a rod, post or pin formed as part of stopper 32 so as to enable stopper 32 to pivot about axis 72. In lieu of pivoting about a mechanical hinge, stopper 32 may alternatively pivot about a living hinge, wherein in the stopper includes at least a portion of which is flexible to permit stopper 32 to be flexed or bent about one or more axes between the first position, second position and intermediate position. In such an alternative embodiment, stopper 32 may be formed from a resiliently flexible material such that stopper 32 is biased towards a selected one of the first and second positions.

Figure 4A:
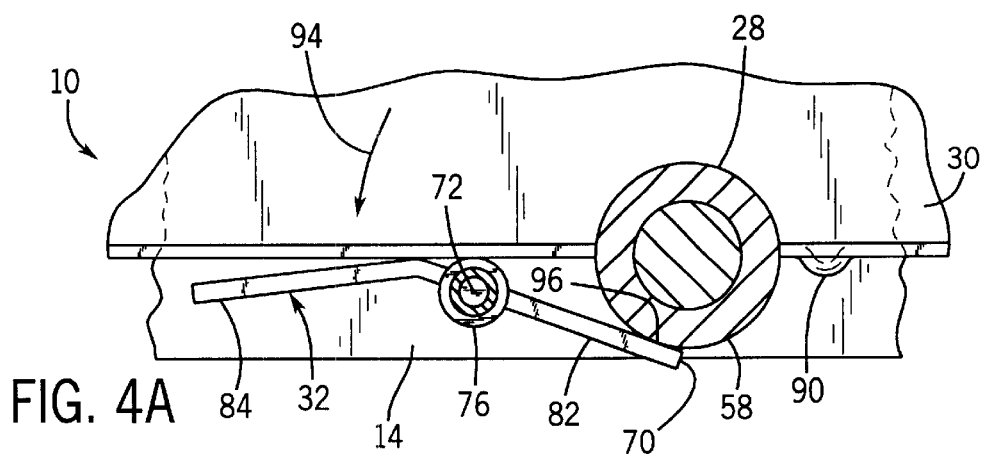
FIG. 4A is an enlarged fragmentary sectional view of the covering system of FIG. 1 taken along line 4A—4A with the cover in the closed position.
Figure 4B:
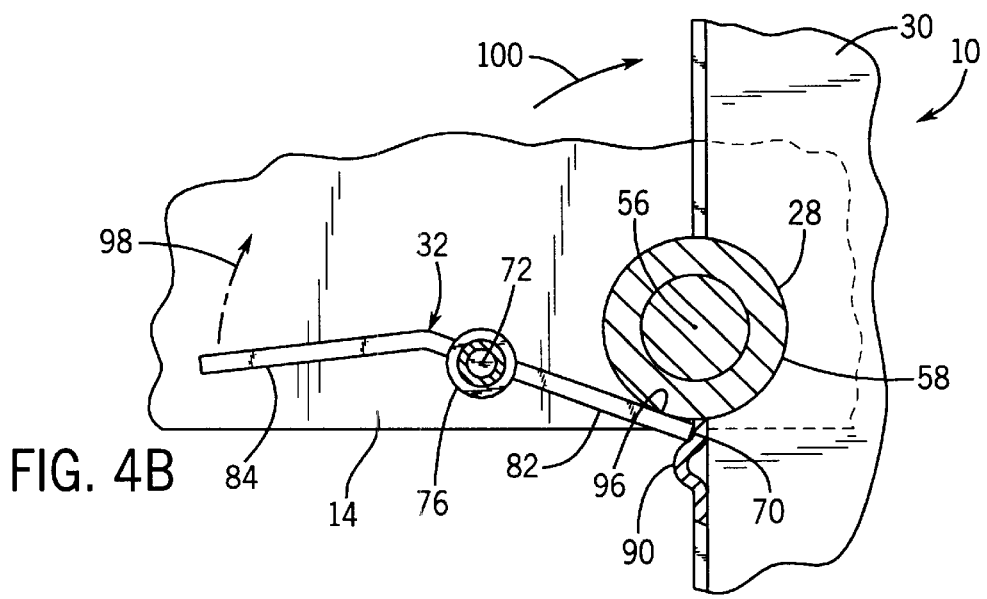
FIG. 4B is an enlarged fragmentary sectional view of the covering system of FIG. 1 taken along line 4A—4A with the cover in the intermediate position.

FIGS. 3A–3C and 4A–4C illustrate stopper 32 in greater detail and its movement between the first position, the second position and the at least one intermediate position. As best shown by FIG. 4A, stopper 32 generally includes wings 82, 84 coupled to and extending from sleeve 76. Wings 82 and 84 extend from opposite sides of sleeve 76 and comprise rigid tabs or plates preferably formed from a metal such as stainless steel. Alternatively, wings 82 and 84 may be integrally formed as part of a single unitary body with sleeve 76 and may be made from a variety of alternative rigid materials. Wing 82 provides a stop surface 70 configured and located so as to engage cover 30 and retain cover 30 in the intermediate position. As best shown by FIG. 4B, cover 30 includes a stopper engagement surface 90 which engages stop surface 70 when cover 30 is in the intermediate position. Stopper engagement surface 90 preferably comprises a detent formed by a bulbous indented dimple providing a convex surface configured to abut and engage stopper surface 70. Alternatively, stopper engagement surface 90 may comprise a depression, recess or other opening, formed by cutting, metal deformation and the like, which receives and bears against stop surface 70 during such engagement. Surface 90 may also comprise a projection provided by other means such as a weld bead and the like. The exact location and configuration of stop surface 70 and stopper engagement surface 90 may be varied depending upon the location of axes 56 and 72, the size and configuration of cover 30 and wing 82, and the desired angular orientation that cover 30 is to be retained when in the intermediate position. Moreover, in lieu of being provided with a single stopper engagement surface 90, cover 30 may be provided with additional stopper engagement surfaces configured to engage stop surface 70 such that cover 30 may be selectively retained in any one of a plurality of intermediate positions between the closed position and the fully open position.

Wing 84 extends from sleeve 76 and serves two functions. First, wing 84 provides a counterweight to stop surface 70 on an opposite side of axis 72. Because the overall weight of wing 84 is greater than the overall weight of wing 82, stopper 32 is biased by gravity toward the first position shown in FIGS. 4A and 4B. As a result, stopper 32 automatically repositions itself upon being released to engage cover 30 and retain cover 30 in the intermediate position when cover 30 is rotated from the fully closed towards the fully opened position or vice versa.

Figure 4C:
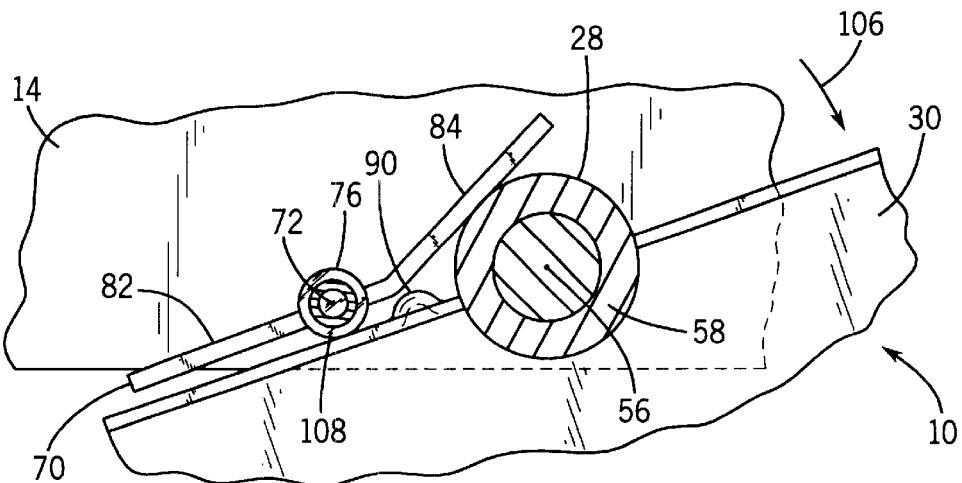
FIG. 4C is an enlarged fragmentary sectional view of the covering system of FIG. 1 taken along line 4A—4A with the cover in the substantially open position.

Second, wing 84 serves as a lever for actuating stop surface 70 between the first position shown in FIGS. 4A and 4B and a second position such as shown in FIG. 4C. In particular, wing 84 provides a surface by which a person may grasp to pivot or rotate stop surface 70 about axis 72 out of engagement with stopper engagement surface 90 of cover 30 to enable cover 30 to be lifted and rotated to the substantially open position shown in FIG. 4C. Although wing 84 is shown as an essentially flat tab, wing 84 may have a variety of other configurations for facilitating its being grasped by a user and utilized as a lever.

Because wing 84 provides a counterweight to stop surface 70, stopper 32 naturally pivots under the force of gravity in the direction indicated by arrow 94 about axis 72 until wing 82 contacts or engages sleeve 58. When wing 82 is in engagement with sleeve 58, stop surface 70 is positioned so as to engage stopper engagement surface 90 of cover 30 when cover 30 is rotated from the closed position towards the potentially open position or vice versa. In lieu of sleeve 58, system 10 may be provided with other alternative stopper locator mechanisms or surfaces that locate stopper 32 when stopper 32 rotates about axis 72 under its bias. For example, in lieu of utilizing a stopper locator surface 96 provided by sleeve 58, inner frame 14 or outer frame 12 may be provided with a projection configured to engage wing 82 or wing 84 as stopper 32 rotates about axis 72 under its gravitational bias. The pivot mechanism pivotally supporting stopper 32 may also or alternatively include a stopper locator surface configured to limit or control the extent to which stopper 32 rotates about axis 72 so as to locate stopper surface 70 in a desired location for engagement with cover 30.

In an exemplary embodiment, wing 84 formed from generally the same material, has generally the same thickness and has generally the same width of that of wing 82 for ease of manufacture and for aesthetic attractiveness. To provide wing 84 with a weight greater than wing 82, wing 84 has a longer length. Alternatively, wing 84 may be formed from a denser material, may have a greater width or might have a greater volume of material so as to have a greater weight as compared to wing 82.

FIGS. 3A–3C illustrate cover 30 being rotated about axis 56 between various position. FIGS. 4A–4C illustrate stopper 32 in greater detail when cover 30 is in the various positions. FIGS. 3A and 4A illustrate cover 30 in a closed position. In the closed position, cover bears or rests upon connectors 16 so as to substantially span inner frame 14 and pans 18, 20 (schematically shown in FIG. 2). When cover 30 is in the closed position, stop surface 70 of stopper 32 is out of engagement with stopper engagement surface 90 of cover 30. As a result, the counterweight provided by wing 84 causes stopper 32 to pivot in the direction indicated by arrow 94 until wing 82 abuts stopper locator surface 96 provided by pivot mechanism of cover 30. Stopper 32 maintains its position until stopper 32 is forcibly rotated against the gravitational bias as a result of the user lifting upon wing 84 in the direction indicated by arrow 98 (shown in FIG. 4B) or as a result of cover 30 engaging wing 82 to pivot stopper 32 in the direction indicated by arrow 98.

Figure 2:
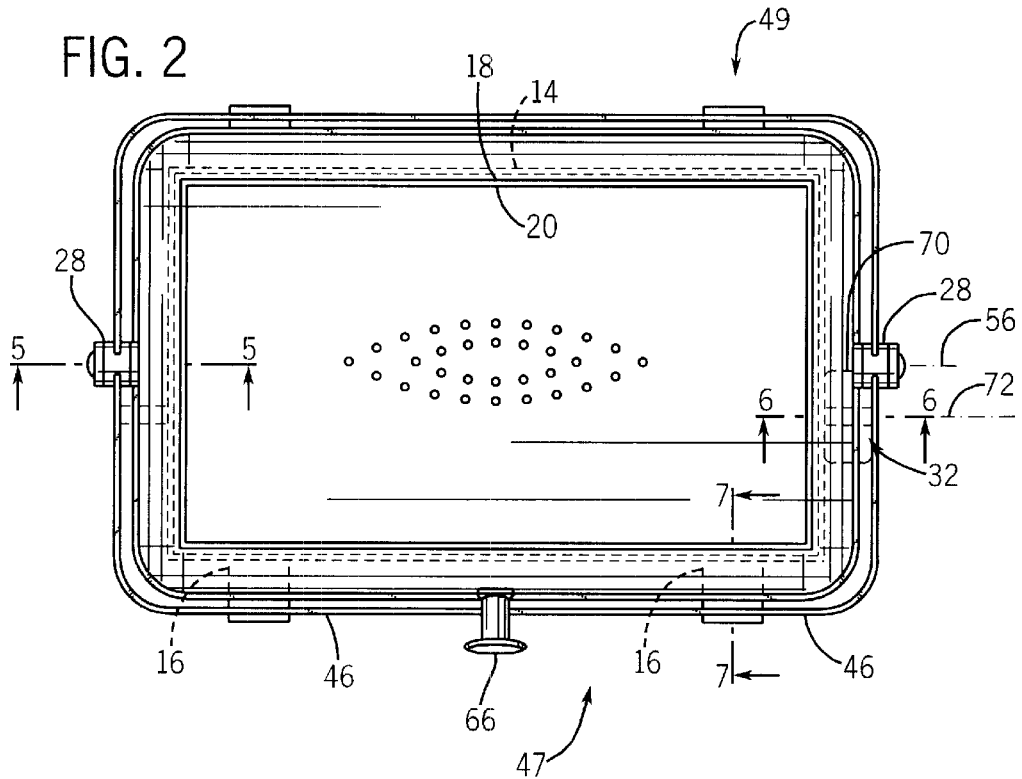
FIG. 2 is a top elevational view of the covering system of FIG. 1 further including schematically illustrated pans.

FIGS. 3B and 4B illustrate system 10 after cover 30 has been moved to an intermediate, partially open position. Movement of cover 30 from the closed position shown in FIG. 3A to the intermediate position shown in FIG. 3B generally requires that cover 30 be rotated about axis 56 in the direction indicated by arrow 100 as shown in FIG. 4B. Rotation of cover 30 about axis 56 is continued until stopper engagement surface 90 of cover 30 receives and engages stop surface 70 of stopper 32 (as shown in FIG. 4B). Continued rotation of cover 30 in the clockwise direction (as indicated by arrow 100) is prevented by stopper 32. Preferably, stop surface 70 is configured to engage stopper engagement surface 90 of cover 30 after cover 30 has been sufficiently rotated about axis 56 such that bottom 102 of cover 30 is substantially vertical so as to form a substantially 90 degree opening to the food or other material contained within the pan 20 (as shown in FIG. 2). Preferably, cover 30 is weighted towards its rear side 49 such that cover 30 is biased towards continued rotation in clockwise direction (as seen in FIG. 3B) about axis 56 such that cover 30 does not unintentionally pivot back to the fully closed position. Alternatively, stopper 32 and cover 30 may be configured to cooperatively engage one another such that bottom 102 is slightly rotated past vertical such that cover 30 maintains contact with surface 70. Although less desirable, other mechanisms may also be employed for preventing cover 30 from unintentionally rotating back towards the closed position. Although cover 30 is illustrated as providing a substantially 90 degree opening when cover 30 is in the intermediate position, stopper 32 and cover 30 may be alternatively configured such that cover 30 provides differently sized openings when in one or more intermediate positions.

FIGS. 3C and 4C illustrate cover 30 in the substantially open position. In the substantially open position, a substantial majority of inner frame 14 and pan 20 (as shown in FIG. 2) is exposed while a majority of cover 30 extends below inner frame 14. When cover 30 is in a substantially open position, stop surface 70 is out of engagement with stopper engagement surface 90. As shown in FIG. 4B, to disengage stopper surface 70 from stopper engagement surface 90, wing 84 is grasped and lifted in the direction indicated by arrow 98 such that stop surface 70 rotates clockwise about axis 72 out of engagement with stopper engagement surface 90. As a result, cover 30 may be further rotated about axis 56 in the direction indicated by arrow 106 (as shown in FIG. 4C) until the desired substantially open position is attained. During such rotation of cover 30, cover 30 full engages wing 82 to continue pivoting stopper 32 about axis 72 in a clockwise direction (as seen in FIG. 4C). In the exemplary embodiment, cover 30 may be rotated until cover 30 engages sleeve 76 of stopper 32. As a result, sleeve 76 provides a stop surface 108 which defines the substantially open position of cover 30. Alternatively, stopper 32 and cover 30 may have other configurations and locations such that cover 30 attains different substantially open positions. For example, in alternative embodiments, stopper 32 and cover 30 may be reconfigured such that cover 30 may be rotated until handle 66 contacts outer frame 12. In yet another alternative embodiment, stopper 32 and cover 30 may be reconfigured such that bottom 102 extends substantially horizontal when cover 30 is in the substantially open position. In yet another alternative embodiment, stopper 32 may be reconfigured such that cover 30 engages wing 84 while wing 82 abuts sleeve 58 when cover 30 is in the substantially open position.

To return cover 30 to either the intermediate position or the substantially closed position, cover 30 is simply pivoted about axis 56 in a clockwise direction (as seen in FIG. 4C) until either stop surface 70 engages stopper engagement surface 90 (for the intermediate position) or until bottom 102 of cover 30 rests upon surfaces of connectors 16.

Overall, system 10 provides a simple, easy to assemble and easy to clean mechanism that allows a cover to be rotated or pivoted to a closed position, a substantially open position and at least one intermediate position. In particular, stopper surface 70 engages cover 30 by simply pivoting about an axis between one of various positions. Stop surface 70 is biased such that it automatically returns to a cover engagable location or orientation when cover 30 has been moved out of engagement with stop surface 70. This bias is provided by the force of gravity, eliminating the need for more costly, complex and difficult to clean biasing mechanisms.

Although stopper 32 has been illustrated as being utilized as part of a roll top chafer having a semi-cylindrical dome-shaped cover, stopper 32 may alternatively be employed in a variety of other types of covering systems. For example, stopper 32 may alternatively be employed as part of a roll top chafer having a semi-spherical dome-shaped cover. Stopper 32 may also be employed in food displaying and serving containers other than chafers. Stopper 32 may also be employed in other food covering systems where it may be desirable to rotate or pivot a cover between a closed position, a fully open position and an intermediate position, such as in grills, ovens and the like. Moreover, stopper 32 may also be advantageously utilized in other covering systems such as incubators and the like. Such various uses are contemplated within the present disclosure.

Although the present invention has been described with reference to preferred embodiments, workers skilled in the art will recognize that changes may be made in form and detail without departing from the spirit and scope of the invention. For example, although different preferred embodiments may have been described as including one or more features providing one or more benefits, it is contemplated that the described features may be interchanged with one another or alternatively be combined with one another in the described preferred embodiments or in other alternative embodiments. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A covering system comprising:
    a frame;
    a cover pivotally coupled to the frame, wherein the cover pivots between a closed position, a substantially open position and at least one intermediate position; and
    a stop surface pivotally coupled to the frame for rotation about a first horizontal axis, wherein the stop surface pivots between a first position in which the surface engages the cover when the cover is in the at least one intermediate position to retain the cover in the at least one intermediate position and a second position permitting the cover to be pivoted to at least one of the substantially open position and the closed position, and wherein the stop surface is biased towards the first position by gravity.

2. The system of claim 1, wherein the cover rotates about a second axis offset from the first axis.

3. The system of claim 1, including a stopper providing the stop surface, wherein the stop surface extends on a first side of the first axis and where the stopper includes a counterweight on a second side of the first axis.

4. The system of claim 1, wherein the stop surface is in the first position when the cover is in the closed position.

5. The system of claim 1, including a stopper providing the stop surface and a pivot mechanism pivotally coupling the cover to the frame, wherein the stopper engages the pivot mechanism when the stop surface is in the first position.

6. The system of claim 1, including a food supporting surface coupled to the frame, wherein the cover covers the food supporting surface in the closed position.

7. The system of claim 6, wherein the food supporting surface includes a pan.

8. The system of claim 7, including a heat source below the pan.

9. The system of claim 6, including a heat source below the food supporting surface.

10. The system of claim 9, including a support surface coupled to the frame and supporting the heat source below the food supporting system.

11. The system of claim 6, wherein the cover extends beneath the heat source when in the substantially open position.

12. The system of claim 1, and the system comprises a roll top chafer.

13. The system of claim 1, wherein the cover is a dome.

14. The system of claim 1, including a support surface coupled to the frame and configured to support the cover in the closed position.

15. The system of claim 1, including a second stop surface coupled to the frame and configured to engage the cover to retain the cover in the substantially open position.

16. The system of claim 15, including a stopper providing the first stop surface and the second stop surface.

17. The system of claim 1, wherein the cover includes at least one detent configured to engage the stop surface when the cover is in the at least one intermediate position and when the stop surface is in the first position.

18. The system of claim 1, wherein the cover includes a rim providing the detent.

19. The system of claim 1, wherein the cover rotates greater than 90 degrees between the closed position and the open position.

20. The system of claim 1, wherein the cover rotates greater than 135 degrees between the closed position and the open position.

21. The system of claim 1, wherein the cover rotates approximately 90 degrees from the closed position to an intermediate position.

22. A cover system comprising:
    a frame;
    a cover pivotally coupled to the frame, wherein the cover includes a stopper engagement surface and wherein the cover pivots between a closed position, a substantially open position and at least one intermediate position; and
    a stopper pivotally coupled to the frame so as to pivot about an axis, when the stopper includes a stop surface that pivots between an engaged position so as to engage the stopper engagement surface of the cover when the cover is in the intermediate position to prevent the cover from further pivoting towards the open position and a disengaged position so as to permit the cover to rotate to the open position, wherein the stopper provides a counterweight on a second side of the axis so that the stop surface is biased towards the engaged position by means of gravity.

23. A roll top chafer comprising:
    a frame;
    a food pan coupled to the frame;
    a support coupled to the frame and adapted to support a heat source beneath the food pan;
    a cover including a stopper engagement surface and pivotally coupled to the frame for rotation between a closed position, a substantially open position and an intermediate position; and
    a stopper pivotally coupled to the frame so as to pivot about an axis, when the stopper includes a stop surface that pivots between an engaged position so as to engage the stopper engagement surface of the cover when the cover is in the intermediate position to prevent the cover from further pivoting towards the open position and a disengaged position so as to permit the cover to rotate to the open position, wherein the stopper provides a counterweight on a second side of the axis so that the stop surface is biased towards the engaged position by means of gravity.

* * * * *